United States Patent [19]

Tominaga et al.

[11] 4,419,001

[45] Dec. 6, 1983

[54] MOTOR DRIVEN FILM WIND-UP AND REWIND DEVICE FOR CAMERAS

[75] Inventors: Shinji Tominaga; Toshinori Imura; Ikushi Nakamura, all of Sakai, Japan

[73] Assignee: Minolta Camera Kabushiki Kaisha, Japan

[21] Appl. No.: 381,717

[22] Filed: May 24, 1982

[30] Foreign Application Priority Data

May 29, 1981 [JP] Japan .................................. 56-83382
Jun. 1, 1981 [JP] Japan .................................. 56-84737

[51] Int. Cl.³ .............................................. G03B 1/18
[52] U.S. Cl. .................................. 354/173.1; 354/214
[58] Field of Search ................ 354/171, 173, 204–206, 354/213, 214

[56] References Cited

U.S. PATENT DOCUMENTS

| | | | |
|---|---|---|---|
| 2,728,281 | 12/1955 | Mihalyi | 354/213 |
| 3,946,409 | 3/1976 | Toyoda | 354/173 |
| 3,999,197 | 12/1976 | Iwashita et al. | 354/173 |
| 4,229,091 | 10/1980 | Date et al. | 354/173 |
| 4,251,148 | 2/1981 | Stemme et al. | 354/173 |
| 4,342,509 | 8/1982 | Wakabayashi et al. | 354/173 |

*Primary Examiner*—William B. Perkey

*Attorney, Agent, or Firm*—Watson, Cole, Grindle & Watson

[57] ABSTRACT

A motor driven film wind-up and rewind device for cameras is automatically switched from a film wind-up mode to a film rewind mode when the entire length of an unexposed film has been wound on a film take-up spool and surely remains in the film rewind mode thereafter. For the automatic switching of the modes a circuit detects increase in a motor current which occurs with a motor forced to stop after completion of the film wind-up. A movable member which is in the form of an through axle extending through a film rewinding sprocket moves from a first position to a second position immediately after initiation of the motor rotation for the film rewind, switching a switch to a state maintaining the device in the film rewind mode as well as connecting the sprocket with the motor. The movable member is returned to the first position in response to insertion of a film cartridge into a cartridge chamber of the camera and restrained at the first position till the initiation of the film rewind. With no cartridge inserted in the cartridge chamber the movable member is not returned to the first position so that the device remains in the film rewind mode allowing a camera exposure operation.

6 Claims, 7 Drawing Figures

FIG.1

MOTOR DRIVEN FILM WIND-UP AND REWIND DEVICE FOR CAMERAS

BACKGROUND OF THE INVENTION

1. Field of the Invention

The present invention relates to a film wind-up and rewind device for cameras which is adapted for use with film contained in a film cartridge (or Patrone in German). In particular it is concerned with a motor driven film wind-up and rewind device which, upon loading of a film, winds up the entire length of the unexposed film out of the cartridge beforehand and rewinds the film, frame by frame back into the cartridge, upon completion of the exposure of each frame.

2. Description of the Prior Arts

A camera has been proposed in which the entire length of unexposed film (in a cartridge) is wound-up on a spool in advance with a drive spring being charged by the film transportation, and the film is rewound frame by frame into the cartridge by the force of the charged spring in conjunction with the exposure of each film. (See a Japanese published patent application with a publication No. Sho 38-20424.) Additionally, Japanese laid-open patent application with a laid-open number Sho 54-158920 discloses a camera in which a film is driven in the same manner but by an electric motor. However, the disclosure in it is chiefly directed to an indication of the exposed frame number by the number of remaining unexposed frames, and does not refer to any definite structure for the wind-up and rewind of a film by a motor.

Ordinary cameras, in which a film is wound up frame by frame after each exposure, can be operated whether they are loaded with a film or not. However, the camera of the above mentioned pre-wind-up type cannot be set up for use and cannot become ready for operation unless it is loaded with film, because such a camera is set for use after the entire length of an unexposed film has been wound up. Nevertheless, even such a camera is often required to operate without film therein, for example in the case when the operation of the camera is checked or examined during its assembly procedure, or when the camera operation is demonstrated before customers in a camera shop, or when a user checks the operation of his or her camera before loading it with film. The camera operation required in such cases is usually available in a state when the camera has been set after the film wind-up has been completed, but should preferably be available even when it is not loaded with film.

SUMMARY OF THE INVENTION

It is accordingly an object of the present invention to provide a motor driven film wind-up and rewind device for cameras which is automatically switched from a film wind-up mode to a film rewind mode when the entire length of an unexposed film has been wound on a film take-up spool and which surely remains in the film rewind mode thereafter.

Another object of the present invention is to provide a motor driven film wind-up and rewind device of the above mentioned type, which makes it possible to operate the camera even without the camera loaded with a film.

To accomplish these objects, a motor driven film wind-up and rewind device of the present invention includes a means for detecting increase in a motor current which occurs with a motor forced to stop due to completion of wind-up of the entire length of an unexposed film on a film take-up spool. Upon the detection, the means generates an output, which causes a motor drive circuit to supply the motor with a reverse directional motor current so that the motor is rotated in the reverse direction to initiate rewind of the film. Immediately after the initiation of the motor rotation in the reverse direction, movable means moves from a first position to a second position to connect the sprocket with a film drive mechanism including the motor. The motor drive circuit includes a first switch means which is switched from a first state to a second state in response to the movement of the movable means from the first position to the second position and which remains in the second position with the movable means being in the second position. With the first switch means being in the second position, the motor drive circuit can supply the motor with the reverse directional motor current and is left in this condition for rewind of the film so long as the movable means is not restored to the first position.

In a preferred embodiment of the present invention, the motor drive circuit further includes a second switch means which is switched from a first state to a second state in response to completion of rewind of the film by the length of one frame and from the second state to the first state in response to termination of a camera exposure operation. The first and second switch means in the respective second states cause the motor drive circuit to supply the motor with no current for stopping the motor while the first switch means in the second state and the second switch means in the first state cause the motor drive circuit to supply the motor with the reverse directional motor current for rewind of the film. Thus, the film is automatically rewound frame by frame upon each termination of a camera release operation.

Additionally, insertion of a film cartridge into the cartridge chamber causes a cartridge detector to move from a first position to a second position. In the course of this movement of the cartridge detector, a means forces the movable means to return to the first position. The movable means is in the form of a through axle which extends through the sprocket in the longitudinal direction and rotates with the motor. Although the returning means retracts to allow the movement of the movable means to the second position when the insertion of the film cartridge into the cartridge chamber has been completed and the cartridge detector has reached the second position, a restraining means restrains the movable means at the first position until the latter is rotated by a given small angle by the rotation of the motor in the reverse rotation. The cartridge detector is provided with a means for releasing the restraint of the movable means by the restraining means in response to the return movement of the cartridge detector, independently from the rotation of the movable means by the rotation of the motor in the reverse direction. It is to be understood that, when no film cartridge is received in the film cartridge, the cartridge detector remains in the first position leaving the movable means in the second position. Hence the motor drive circuit is left in the condition for rewind of the film which allows a shutter cocking operation of the camera. Accordingly, it is made possible to operate the camera with the camera loaded with no film.

The above and other objects and features of the present invention will become more apparent from the following description of the preferred embodiment taken in conjunction with the accompanying drawings.

BRIEF DESCRIPTION OF THE DRAWINGS

FIG. 1 is a perspective view of the essential mechanical part of a film wind-up and rewind advice according to an embodiment of the present invention;

FIGS. 2(a) and 2(b) are a partial perspective view and a bottom plane view showing the detail of the lower tip portion of a through-axle 15 shown in FIG. 1, wherein FIG. 2(a) is a view seen obliquely from the bottom;

DESCRIPTION OF A PREFERRED EMBODIMENT

Figure 2A:
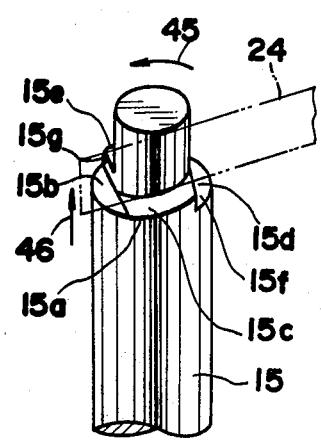

With reference to FIG. (1) showing the mechanical part of a device according to the present invention, spool 1 takes up film 3 out of a film cartridge (not shown) when it rotates counterclockwise as shown by arrow 2. The driving force for the film wind-up is produced by motor 4 and transmitted through a gear train (not shown) to intermediate gear 5 and further to spool gear 13 through intermediate gear 5. Spool 1 is provided, at its lower portion, with pawl portion 6 which is engageable with perforations or sprocket holes of the film and reduced diameter portion 7 with a diameter smaller than that of the spool body. Detector lever 8 for detecting whether a film is wound around spool 1 or not, is arranged at a location where it can abut against reduced diameter portion 7 when no film is wound around spool 1. Detector lever 8 is swingable about stud 9 integrally with arm 10, and is always tensioned by spring 11 in a counterclockwise direction. When no film is wound around the spool, detector lever 8 abuts against reduced diameter portion 7 to close switch 12 moving pin 10 which is at the free end of arm 10. When a film is wound around spool 1, the lower margin of the film (the area of space between the lower perforations and the lower edge) prevents detector lever 8 from abutting reduced diameter portion 7 to keep switch 12 open.

Figure 1:
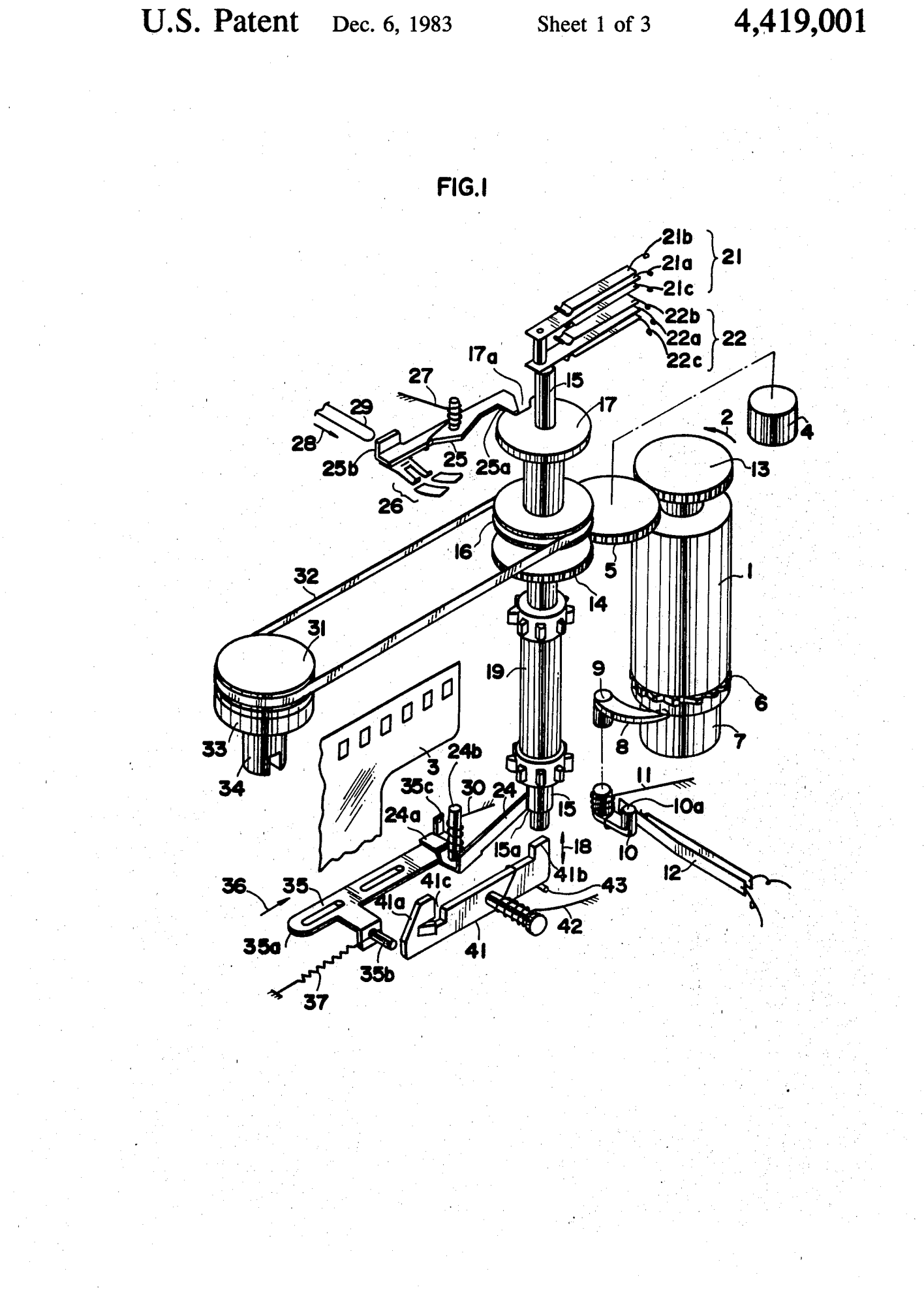

Intermediate gear 5 is further in mesh with sprocket gear 14 which rotates to rotate both pulley 16 and cam plate 17 integrally. Through axle 15 can be moved up and down as indicated by two-headed arrow 18. Through axle 15 is coupled with sprocket 19 through a clutch mechanism such that they are coupled with each other with the axle in the position shown in FIG. 1 and are discoupled from each other with axle 15 having been moved upwards from the FIG. 1 position. The state with axle 15 at its lower position as shown in FIG. 1 is for rewinding the film from spool 1 into the film cartridge. In this state, movable contacts 21a and 22a of switches 21 and 22 are in contact with contacts 21c and 22c respectively. The upward movement of through axle 15 brings, with its top end, movable contact 21a and 22a into contact with contacts 21b and 22b respectively. Additionally, the lower end of through-axle 15 is stepped (down to a smaller diameter) to form 15a such that, when through axle 15 moves upward, restraining-lever 24 engages stepped portion 15a to restrain through axle 15 at the upper (first) position.

Cam plate 17 has formed therein recess 17a which receives protruding cam follower portion 25a of switch lever 25 to open switch 26. Switch lever 26 is urged by spring 27 in the clockwise direction so that its protruding cam follower portion 25a abuts against the cam periphery of cam plate 17. Switch lever 25 is turned counterclockwise to close switch 26 when its upright tab 25b is pushed by pin 29 which is advanced in the direction of arrow 28 by a camera mechanism (not shown) upon termination of an exposure. During the rewinding of the film for one frame to prepare for the next exposure, pin 29 retracts from tab 25b a little time before completion of the film rewinding.

Pulley 16 which is corotatable with cam plate 17 is connected by belt 32 with pulley 31. Pulley 31, when rotating clockwise, drives fork 34 through one-way clutch 33 to rotate a shaft in the film cartridge and rewind the film onto the shaft.

When a film cartridge is put into a predetermined position (film supply chamber of a camera) in the camera, the cartridge pushes end 35a of cartridge detector arm 35 to displace the latter in the direction of arrow 36 against the force of spring 37. As detector arm 35 slides in the direction of arrow 36, pin 35b carried by detector arm 35 comes into contact with slant portion 41a of sprocket release lever 41 to force the lefthand portion of lever 41 downward and turn the lever counterclockwise by a small angle. The counterclockwise rotation of release lever 41 raises its projecting portion 41b which comes into contact with the bottom end of through axle 15 and lifts the axle. When the loading of the film cartridge is completed, pin 35b on detector arm 35 goes beyond slant portion 41a into cut-out 41c of sprocket release lever 41 whereby release lever 41 rotates clockwise under the force of spring 42 to engage stopper 43 with its bottom edge near the right end.

Figure 2B:
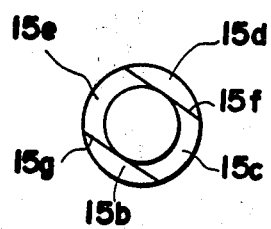

As shown in FIGS. 2(a) and 2(b), the stepped portion 15a of through axle 15 consists of two flat planes 15b and 15d of substantially the same level and inclined planes 15c and 15e which gradually rise along the direction of arrow 45 (gradually lowering as seen in FIG. 1) with their ends 15f and 15g extending vertically. When through axle 15 rotates in the direction of arrow 45 from the position shown in FIG. 2(a) where its upward (i.e. downward as seen in FIG. 1) movement is prevented by leaf spring 24 engaging the reduced diameter position of through axle 15, leaf spring 24 is pushed outward by vertical plane 15f or 15g and brought into contact with the large diameter position of through axle 15 allowing the movement of the axle under the force of movable contacts 21a and 22a in the direction of arrow 46 as seen in FIG. 2a, i.e. in the downward direction as seen in FIG. 1.

Figure 3A:
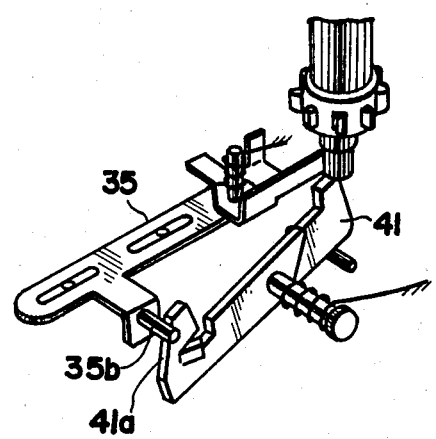
FIGS. 3(a) and 3(b) are perspective views showing operational conditions of a detecting means, wherein FIG. (3a) shows the condition during film loading and FIG. (3b) shows the condition when the film loading has been completed.
Figure 3B:
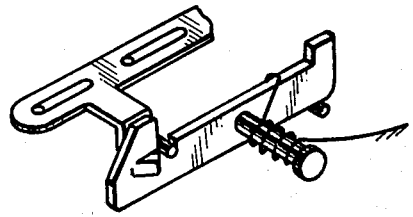
Figure 3C:
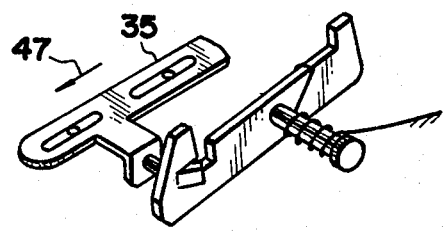
FIG. 3(c) is perspective view showing an operational condition of the detecting means at the time when a film cartridge is being taken out of the camera.

FIGS. 3(a), 3(b) and 3(c) show operational interrelationships between cartridge detector arm 35 and sprocket release lever 41. FIG. 3(a) shows the case where a film cartridge (not shown) being loaded into the camera chamber pushes cartridge detector arm 35 to turn counterclockwise sprocket release lever 41 which in turn lifts through axle 15. FIG. 3(b) shows the case when the film cartridge has been loaded at the predetermined position of the camera. FIG. 3(c) shows the case where cartridge detector (35) is returning in the direction of arrow 47 with the film cartridge being removed from the camera. During the returning movement of cartridge detector arm 35, its upright lug 35c engages arm 24a of restraining plate 24 to rotate the latter plate counterclockwise (as seen in the Figure) about pin or stud 24b against the force of spring 30 whereby restraining plate 24 disengages from the large diameter portion of through axle 15. This is for the purpose of allowing through axle 15 to restore to its lower position (as seen in FIG. 1) when the film cartridge which was once loaded in the camera is removed from the camera before the camera is operated.

Figure 4:
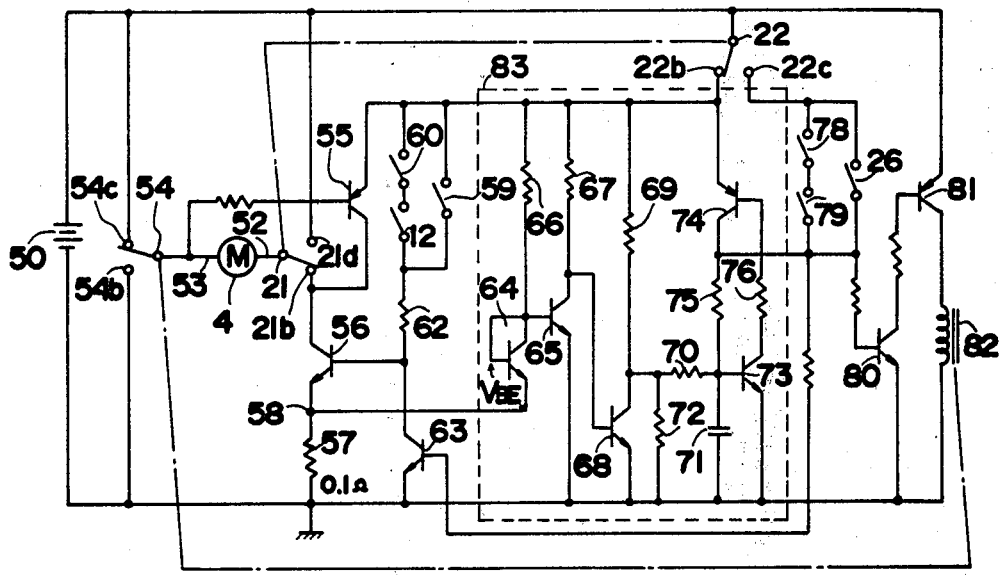
FIG. 4 is a circuit diagram showing a circuit which controls the film wind-up and rewind motor employed in the above mentioned embodiment.

Now, turning to FIG. 4, the control circuit for motor 4 will be described. Terminals 52 and 53 of motor 4 are connected with the movable contacts of the change-over switches 21 and 54 respectively. Motor 4 is supplied with a current of opposite directions according to the connection of the movable contacts. When switches 21 and 54 are connected (as shown in FIG. 4) to allow the current flow from terminal 53 to terminal 52, the motor is driven in a direction which winds-up a film from a cartridge onto spool 1. Conversely, when switches 21 and 54 are switched over to their other terminals respectively, motor 4 is driven in the opposite direction to rewind the film. Additionally, when power transistor 55 is cut off with switch 21 connected with terminal 21b and switch 54 with terminal 54b, motor 4 is driven in a direction which rewinds the film. The operation of power transistor 55 with be described later. Switch 21 is made to be switched along with switch 22 in response to the up and down movement of through-axle 15 as shown in FIG. 1. When through-axle 15 is lifted, switch 21 is connected with terminal 21b and switch 22 with terminal 22b and when through-axle 15 is lowered they are connected with terminal 21c and 22c respectively.

Power transistor 56 must conduct for the film wind-up. Transistor 56 is made conductive in the cases when switch 59 is closed to supply a base current to transistor 56 and when the series connected switches 60 and 12 are both closed. Switch 59 is open with the camera back cover open and closed with the cover closed. Switch 60 is closed when an auxiliary cover (not shown) which is provided within the camera in addition to the back cover is set up in a position to retain the film. Switch 12 is opened when detector lever 8 detects the film wound around spool 1. Switch 26, connected in the base current supply circuit for transistor 80, is operated by lever 25 (shown in FIG. 1), such that it is closed from the termination of an exposure till the shutter has been charged or cocked and the film has been rewound by one frame length, and is open at any other time. Switch 78 is interlocked with a film frame counter mechanism that is closed when the counter value is less than one. It is to be noted that the frame counter increases its counted value as the film is wound up on the spool. Switch 79 is opened during the rewinding of the film when the leading portion of the film disengages from the spool and reaches a given position before it enters the film cartridge.

Next, an explanation will be given about a circuit which is arranged in such a way that the motor driving circuit is automatically switched to the film rewinding condition upon detection of excessive tension of the film which has been wound up to the end from the cartridge on spool 1. When there is excessive tension on the film, the current flowing into the motor increases in comparison with the current at the normal running condition of the motor. Hence, the circuit is designed to detect excessive-tension of the film by the increase in current. Resistor 57 is connected in series with motor 4 through transistor 56 and terminal 21b of switch 21. When transistor 56 conducts with switches 21 and 54 having been changed-over to the condition shown in the Figure, motor 4 is supplied with a current which in turn produces a voltage proportional to the current across resistor 57. Section 83, enclosed by a broken line, is a voltage detecting circuit which detects a rise in voltage level at the node between the emitter of transistor 56 and resistor 57 due to a current increase caused by the excessive tension of the film. The current flowing through motor 4 is about 0.7 A at the normal running condition of the motor but will not be less than 1 A when the motor 4 is forced to stop. If the resistance value of resistor 57 is selected, for example, at 0.1Ω, the voltage drop across resistor 57 will be 70 mV and 100 mV respectively for the two conditions. When the voltage level at junction 58 rises from 70 mV to 100 mV or above, voltage detecting circuit 83 renders transistor 74 conductive, in response to the increased voltage, as will be described hereinafter, to render transistor 63 conductive and cuts off transistor 56, thereby blocking the current to motor 4. At this time, transistors 80 and 81 are rendered conductive to energize the coil of relay 82, thereby switching-over switch 54 to terminal 54b. To the junction between switch 54 and motor 4 is connected the base of PNP transistor 55 through a resistor such that, when switch 54 is changed-over to terminal 54b, transistor 55 conducts to supply current through switch 21 to motor 4. With this current supply, motor 4 rotates in a direction that rewinds the film rotating "through-axle 15", which is then lowered to switch switches 21 and 22 to terminals 21c and 22c respectively, in the same manner as described with reference to FIG. 2. When switches 21 and 22 have been switched as mentioned above, motor 4 is then supplied with current in a direction to rewind the film. During the rewinding of the film in that way, recess 17a of cam plate 17 is positioned to meet the projecting portion 25a of lever 25 and receives the latter to open switch 26. Then, transistors 80 and 81 are both rendered non-conductive to de-energize relay 82, thereby switching switch 54 to terminal 54c. Thus, motor 4 is de-energized and stops. At this time, the shutter mechanism has been charged and pin 28 has been retracted. In this way, preparations for exposure of the first frame are complete.

Next, a description will be given on the structure and operation of the voltage detecting circuit 83. Resistor 66 and diode-connected transistor 64 are serially connected with each other, and together they function as a level shift circuit which applies a voltage across the base-emitter of transistor 65. This voltage is the sum of the voltage at junction 58 and VBE across the base-emitter of transistor 64. Serially connected resistor 67 and transistor 65 function as a voltage amplifier. The resistance value of resistor 67 is determined such that, if the voltage change by transistor 68 is not considered, the voltage appearing at the collector of transistor 65 is half the power source voltage when the voltage applied to the base of transistor 65 is the sum of the voltage V1 produced across resistor 57 at the normal running condition of motor 4 and the base-emitter voltage VBE of transistor 65. Under these conditions, transistor 68 is conductive at the normal running condition of motor 4 with the resistance of resistor 69 being selected to have an appropriate value. Transistors generally have a characteristic such that, when the voltage applied between the base-emitter increases by 18 mV at a temperature of 25° C., the collector current will double. Accordingly, if the current through resistor 57 increases from 0.7 A to 1 A due to the stoppage of motor 4 thereby increasing the voltage across resistor 57 from 70 mV to 100 mV, the collector current of transistor 65 will be more than double. In practice, transistor 65 is saturated when this current is doubled, so that the voltage level at its collector is approximately equal to voltage level at ground. In this case, transistor 68 is rendered non-conductive. Thus, voltage detecting circuit 58 detects relatively small changes in the voltage at junction 58. It should be noted that the power loss by resistor 57 can be restricted to a small value since the resistance value of resistor 57 can be selected to be a relatively small value, for example, 0.1Ω.

The collector of transistor 68 is connected through resistor 70 to the base of transistor 73 such that the latter, transistor 73, is rendered non-conductive and conductive respectively in response to the conduction and non-conduction of transistor 68. However, since capacitor 71 is connected in parallel with the base-emitter of transistor 73, transistor 73 will become conductive after a delay of a given time when transistor 68 inverts from a conductive to a non-conductive state. This is a measure used to avoid a malfunction due to the temporary increase of the motor current upon starting above the current at the normal running condition. Accordingly, the delay time produced by capacitor 71 is selected, for example, to be 200 milliseconds, a little longer than the time taken for the excess current appearing upon the motor initiation to disappear.

The collector and base of NPN transistor 73 are connected through resistors 75 and 76 to the base and collector of PNP transistor 74 respectively so that, once transistor 73 conducts, its conductive state is self-maintained. With the output of transistor 74 under this self-maintained state, transistor 63 is rendered conductive to render transistor 56 non-conductive to interrupt the current supply to motor 4 in a direction for film wind-up.

The general operation of the above-mentioned device will now be explained. When the camera is loaded with a film cartridge, cartridge detector arm 35 is pushed in the direction of arrow 36 to lift through-axle 15 as described with reference to FIG. 3. Then, through-axle 15 is maintained at the lifted position as leaf spring 24 engages stepped portion 15a so that the axle does not transfer the driving force to sprocket 19. When through-axle 15 is raised switches 21 and 22 are thereby switched to terminals 21b and 22b respectively. At this time, transistor 74 remains non-conductive with transistor 81 also remaining non-conductive so that relay 82 is de-energized with relay switch 54 connected to terminal 54c. Now, when the anxiliary inner cover (not shown) is closed after the leading portion of the film is placed on spool 1, switch 60 is closed. Transistor 56 is supplied with base current through switches 60 and 12 and rendered conductive. Thus, the current supply circuit is established for motor 4, which runs to rotate spool 1, thereby winding the film with its perforations engaged by pawls 6 of the spool. When the leading portion of the film is wound around spool 1 during the initial stage of the film wind-up, lever 9 is slightly turned in the clockwise direction to open switch 12. As a result, transistor 56 is rendered non-conductive to stop motor 1. These operations proceed with only the auxiliary inner cover being closed and when the rear cover has not been closed. Thus, when the camera is loaded with the film cartridge and when the leading portion of the film is placed on the spool and the auxiliary cover is closed, the leading portion of the film is automatically wound around the spool, whereby these operations are confirmed by the operator.

Thereafter, when the rear cover is closed, switch 59 is closed to render transistor 56 conductive again to energize motor 4 which winds the film to the end. When the film is excessively tensioned at the end of wind-up, the tension is detected as mentioned before to render transistor 74 conductive thereby rendering transistor 56 non-conductive and transistor 81 conductive. Due to the conduction of transistor 81, relay 82 is energized to switch over switch 54 to terminal 54b. The switch-over of switch 54 renders transistor 55 conductive to supply motor 4 with a current in a direction to rewind the film. Due to the rotation of motor 4, through-axle 15 is rotated in the direction of arrow 45 as shown in FIG. 2 and is lowered as described before to switch over switches 21 and 22 to terminal 21c and 22c respectively. However, transistors 80 and 81 still remain conductive. At this stage, through-axle 15 is connected with sprocket 19. On the other hand, cam plate 17 is rotated until the protruding portion 25a of switch lever 25 engages recess 17a whereby switch 26 is opened to render transistors 81 and 82 non-conductive and switch over switch 54 to terminal 54c resulting in stoppage of motor 4. With this film rewinding operation, the shutter mechanism (not shown) is charged through a well-known self-cocking mechanism such that the shutter charging is completed when switch 26 is opened.

Then, the shutter release button may be depressed to release the shutter and to effect an exposure. Upon termination of the exposure, pin 29 advances to turn switch lever 25 in the counterclockwise direction and closes switch 26. In response to the switch closure, relay 82 is energized to switch over switch 54 to terminal 54b and drives motor 4 in the film rewinding direction until cam plate 17 rotates clockwise by one rotation (360°) whereby switch 26 is opened with the shutter cocked. Then, the same operation is repeated for the photographing operation.

When the film is rewound into the cartridge after all the effective frames of the film has been exposed, the indication of the film frame counter becomes less than "1" whereby switch 78 is closed to supply base current to transistor 80 and render the transistor conductive. This continues the rewinding operation until the leading portion of the film disengages from spool 1 to open switch 79 and motor 4 is stopped. Thus, the film rewinding is stopped before all the film is rewound into the cartridge.

In some cases, it is desirable for the camera to be operable with its rear cover open and with no film loaded for checking or demonstrating the camera operation, for example, in the assembly line of cameras, before customers in a camera shop or exibition show, or in the home of the camera user. If the camera is in such a state, detector arm 35 is at the position shown in FIG. 1 with sprocket axle 15 at its lower position. This connects change-over switches 21 and 22 to terminals 21c and 22c respectively, whereby when the shutter release button is operated, the shutter mechanism is activated and pin 29 advances in response to the termination of the shutter operation to close switch 26 whereby transistors 80 and 81 are rendered conductive to energize relay 82 and switch-over switch 54 to terminal 54b thereby driving motor 52 in the film rewinding direction until the cam plate has rotated by one rotation causing protruding portion 25a of lever 25 to engage its recess to open switch 26 and stop motor 4 which has been running for an amount to rewind a film by one frame length.

What we claim is:

1. In a camera which is adapted to effect a shutter cocking operation with a film rewind by the length of one frame and which includes a film rewinding sprocket, a film take-up spool and a cartridge chamber for receiving a film cartridge, a film wind-up and rewind device comprising:

a film drive mechanism including an electric motor rotatable in both normal and reverse directions and rotating said spool in response to the rotation of said motor in the normal direction for wind-up of the entire length of a film on said spool out of said film cartridge while rotating said sprocket in response to the rotation of said motor in the reverse direction for rewind of the film back into said cartridge;

means urged from a first position for disconnecting said sprocket from said drive mechanism to a second position for connecting said sprocket with said drive mechanism and movable from the first position to the second position immediately after the initiation of the rotation of said motor in the reverse direction;

a motor drive circuit for supplying said motor with first and second currents which serve to rotate said motor in the normal and reverse directions respectively, said motor drive circuit including first switch means which is switched from a first state to a second state in response to the movement of said movable means from the first position to the second position and which remains in the second position with said movable means being in the second position and being adapted to supply said motor with said first current with said first switch means being in the first state and with a camera rear cover closed and to supply said motor with said second current with said first switch means being at the second state; and means for detecting increase in the first current which occurs with said motor forced to stop due to completion of the wind-up of the entire length of the film, to generate an output which causes said motor drive circuit to supply said motor with said second current even with said first switch means being in the first state.

2. A film wind-up and rewind device as defined in claim 1, wherein said motor drive circuit further includes second switch means which is switched between a first state and a second state and is adapted to supply said motor with no current with said first and second switch means being in the respective second state while supplying said motor with said second current with said first switch means being in the second state and with said second switch means in the first state.

3. A film wind-up and rewind device as defined in claim 2, further comprising:

means for switching said second switch means from the first state to the second state upon detection of the rewind of the film by the length of one frame; and means for returning said second switch means to the first state in response to termination of a camera exposure operation.

4. A film wind-up and rewind device as defined in claim 1, 2 or 3, wherein said movable means extends through said sprocket in the longitudinal direction thereof and movable between the first and second positions along the longitudinal direction, said movable means being coupled to said drive mechanism to rotate therewith so as to rotate said sprocket only in the second position.

5. A film wind-up and rewind device as defined in claim 4, further comprising:

a cartridge detector pushed by the film cartridge received in said cartridge chamber to move from a first position to a second position and urged to return to the first position upon removal of the film cartridge from said cartridge chamber;

means for forcing said movable means to return to the first position in the course of the movement of said cartridge detector from the first to second positions thereof and retracting from said movable means to allow the movement thereof from the first to second positions when said cartridge detector is in the second position; and means for restraining said movable means in the first position until said movable means is rotated a given small angle in response to the rotation of said motor in the reverse direction through said film drive mechanism.

6. A film wind-up and rewind device as defined in claim 5, wherein said cartridge detector includes means for releasing the restraint of said movable means by said restraining means in response to the return movement of said cartridge detector to the first position, independently from the rotation of said movable means.

* * * * *